July 15, 1958    H. SCHNADT    2,842,960
TESTING INSTRUMENTS WITH MEANS FOR CENTERING TEST BODIES
Filed Sept. 19, 1955    2 Sheets-Sheet 1

INVENTOR.
HENRI SCHNADT
BY [signature]

July 15, 1958     H. SCHNADT     2,842,960
TESTING INSTRUMENTS WITH MEANS FOR CENTERING TEST BODIES
Filed Sept. 19, 1955     2 Sheets-Sheet 2

INVENTOR.
HENRI SCHNADT

United States Patent Office 2,842,960
Patented July 15, 1958

2,842,960

TESTING INSTRUMENTS WITH MEANS FOR CENTERING TEST BODIES

Henri Schnadt, Zug, Switzerland

Application September 19, 1955, Serial No. 535,177

Claims priority, application Switzerland September 23, 1954

7 Claims. (Cl. 73—101)

This invention relates to testing instruments with means for centering test bodies or specimens thereon.

It is of extreme importance, both in the case of pendulum impact devices or instruments of conventional construction and in the case of instruments which are provided with means for performing slow speed bending tests in accordance with my copending U. S. application Ser. No. 535,176, filed simultaneously herewith, now Patent No. 2,803,131, that the specimen or test body be accurately centered for testing purposes. Heretofore this has been accomplished by means of special, non-stationary centering gauges or devices.

Such procedure is, however, time-consuming, especially when in such tests an extraordinarily large number of specimens with different forms or types of notches are to be tested. In addition the specimens are also tested at high and low temperatures so that the time losses caused by the use of the aforesaid special centering devices become excessive because in the time interval so spent the temperature of the test body, which is taken from a very precisely adjusted heating or cooling device, is altered to a great extent.

The principal object of the present invention is therefore directed to means facilitating easy centering of Schnadt type specimens, as disclosed in my U. S. Patent No. 2,617,293, in pendulum impact devices. Means which are designed for centering the test body are arranged for coaction with at least one of the ends of a bending pin or element projecting beyond the sides of the specimen.

These and other objects of the invention will become further apparent from the following detailed description, reference being made to the accompanying drawings, showing preferred embodiments of the invention.

Figure 1:
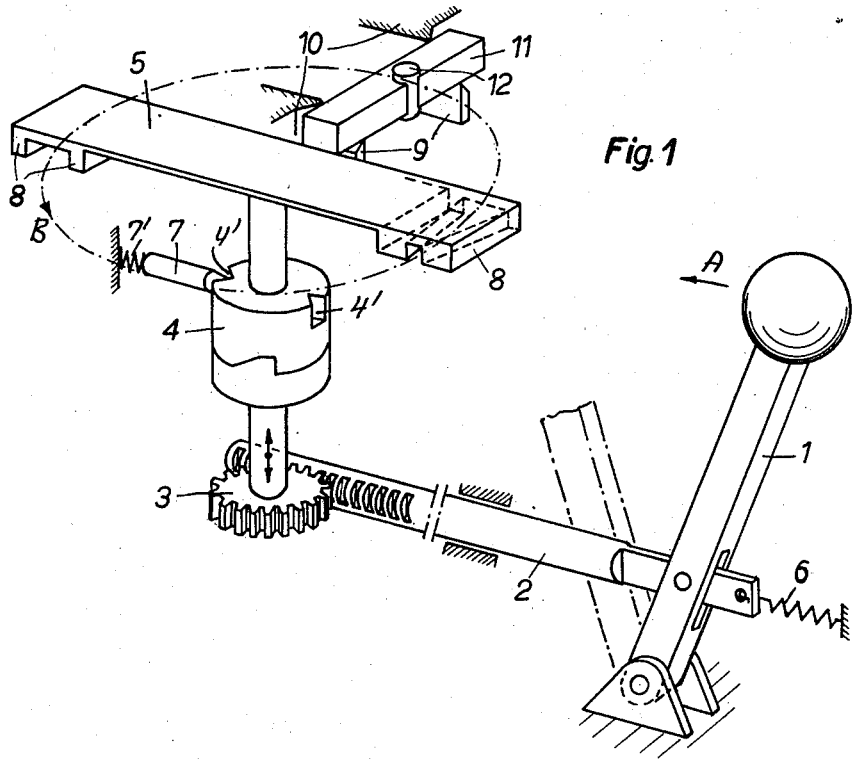
Fig. 1 shows an embodiment of a centering arrangement made in accordance with the present invention as applied to a pendulum impact device during impact bending tests.

Referring now more particularly to Fig. 1, there is disclosed a hand lever 1 pivotally connected with a rack 2, the teeth of which mesh with a pinion or gear 3. The gear 3 is coupled by means of a claw clutch or coupling 4 with a rotatable support or beam 5. Connected to the end of a rack 2 adjacent the hand lever 1 is a spring 6 which biases the rack to its starting position (the right-hand position in Fig. 1).

Formed in the upper portion of the clutch 4 are two notches or recesses 4' into which the tip of a locking bolt 7 may be forced by means of a spring 7'. The pin or bolt 7 thus retains the upper half of the clutch stationary when upon return movement of the rack 2 to its starting position, the lower axially displaceable clutch half is rotated backwards.

Arranged on both ends of the beam 5 are pairs of guide ledges 8, the ledges of each pair converging toward each other. The specimen 11 to be tested, according to the system of Schnadt, is provided with a transverse channel and with a bending pin or bolt member 12 positioned in the channel at the center of said specimen and adjacent one of its surfaces, said specimen being supported by bearing elements or supports 9 and restrained against lateral displacement in one direction by means of abutments 10. The narrowest portion of the gap between each pair of guide ledges 8 is, of course, only very slightly wider than the pin 12 to enable the beam 5 to pass the latter.

The operation of the arrangement according to Fig. 1 is as follows:

Upon movement of the hand lever 1 in the direction of the arrow A the rack 2 is displaced to the left and rotates, through the gear 3 and the claw clutch 4, the beam 5 in the direction of the arrow B. As a result the upwardly projecting end of the bending pin 12 for the specimen 11 is engaged by one of the guide ledges 8. The specimen 11, which is pressed against the abutments 10, is therefore displaced longitudinally of itself by means of the guide ledge which engages the pin 12 until it is exactly centered, whereupon same is located in the narrowest portion of the guide gap and the beam 5 is free to rotate further.

After the beam 5 has been rotated through an angle of 180° it is retained in position by means of the locking bolt 7 while the rack 2 and the hand lever 1 are returned to their initial position by means of the spring 6, during which time the clutch 4 is idle or disengaged. As may be seen from Fig. 1 the rest or inoperative position of the beam 5 is so chosen that it does not interfere with the swinging movement of the impact pendulum (not shown). In order to reduce heat exchange between the specimen 11 and the frame of the pendulum impact device, the supports 9 are provided with or constructed as knife edges.

Figure 2:
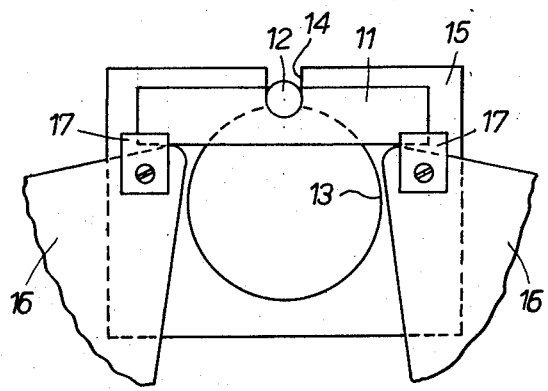
Fig. 2 is a front elevational view of a modified embodiment of a centering arrangement, as it is employable for slow speed bending tests.
Figure 3:
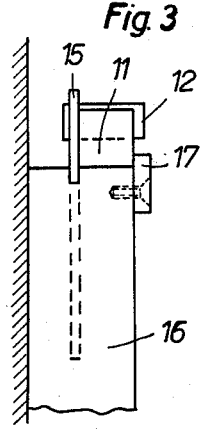
Fig. 3 is a side view of the arrangement of Fig. 2.

In the embodiment according to Figs. 2 and 3 there is provided a plate 15 having a cut-out portion 13 and a centering groove 14. Additionally, the supports 16 for the specimen 11 provided with a bending pin 12 are provided with a pair of abutments 17. This arrangement is especially suited for use in conducting slow speed bending tests according to the above identified copending application.

The test body 11 is, for example, pressed against the plate 15 by means of a pair of tongs in such a manner that the end of the pin 12 which projects from the specimen on the side thereof facing the plate 15 engages the upper interior edge of the cut-out portion 13. The longitudinal axis of the bending pin thus forms an acute angle with the resting plane of the specimen, which plane is defined by the supports or bearing elements 16.

The specimen 11 is now laterally shifted or displaced until the aforesaid projecting end of the bending pin 12 is introduced into the centering groove 14 of the plate 15. In this manner, the specimen 11 is brought to rest on the supports 16, and through rotation of the specimen about its longitudinal axis the longitudinal axis of the bending pin 12 is made parallel to the resting plane for the specimen. The specimen is now secured against displacement transversely of itself by the plate 15 and the abutments 17, while at the same time it is secured against longitudinal displacement by the interengagement of the projecting end of the pin 12 and the walls of the centering groove 14.

Figure 4:
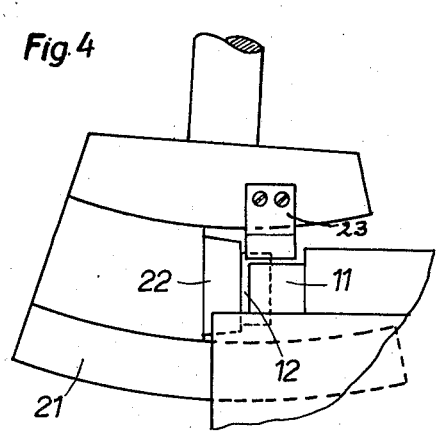
Fig. 4 is a side elevational view of a further modified embodiment of a centering arrangement made according to the invention, in which the centering arrangement is attached directly to the pendulum hammer.
Figure 5:
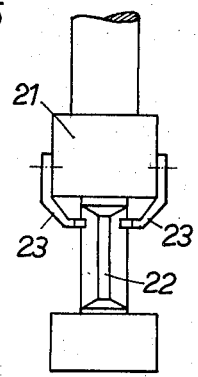
Fig. 5 is a front elevational view of the hammer shown in Fig. 4.
Figure 6:
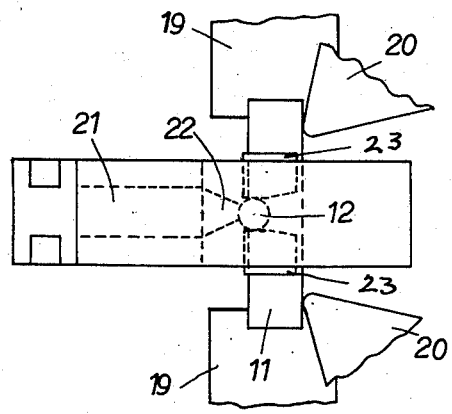
Fig. 6 is a top plan view of the arrangement of Fig. 4, the pendulum arm being omitted for the sake of clarity.

Referring now to Figs. 4 to 6, the specimen 11 is supported on bearing elements or supports 19 and has one of its sides engaging with the spaced abutments 20. The pendulum hammer 21, which is provided with an impact element 22, has attached thereto at corresponding points a pair of guide members 23 which at an elevation corresponding to the projecting upper end of the bending pin 12 in the specimen 11 form a slot decreasing in width in the direction of the impact element 22.

Upon downward swinging movement of the pendulum hammer 21 the upper projecting end of the bending pin 12 slides along one or the other of the guide members 23. The test body or specimen 11 is thus displaced transversely to the path of movement of the pendulum hammer 21 in such a manner that at the same moment at which the impact element 22 engages the bending pin 12 the longitudinal axis of the latter is disposed in the same plane as the central vertical plane passing through the element 22 at right angles to the axis of rotation of the pendulum.

Other modifications than the above described arrangements are, of course, possible, in which it will always be necessary that for centering the test body at least one of the projecting ends of the bending pin provided in the specimen being tested, is employed.

Summarizing, therefore, it will be realized from the foregoing disclosure that the underlying concept of the invention is the provision of guide means in the form of a pair of guide walls spaced from each other sufficiently to permit passage therebetween of one of the projecting ends of the bending pin or element 12 incorporated in the test specimen 11. These guide walls may constitute a part of the testing instrument per se or may be used as an adjunct thereto but positioned operatively with respect to the location of contact between the impact member and the specimen.

Thus, in Fig. 1 the guide walls 8 are distinct from the pendulum and are so located as to move past the specimen while in engagement with the bending element 12. In the modification of Figs. 2 and 3 the specimen is moved until the pin 12 is located between the walls of the groove 14. In the modification according to Fig. 6 the guide walls are directly attached to the pendulum and are positioned in advance of the impact element 22 when used in the direction of its movement. Consequently, in this last mentioned modification the guide walls 23 pass and center the pin 12 and the specimen 11 immediately prior to the time that the impact element 22 hits the pin 12.

It can thus be seen that there has been provided in accordance with this invention a centering device for a pendulum impact instrument used according to the system of Schnadt in which a test specimen with a bending element incorporated therein is employed, comprising guide means located in the path of movement of the pendulum of said instrument and constructed to displace said test specimen through the intermediary of said bending element, said guide means being engageable with said bending element adjacent one end thereof to thereby locate said test specimen in a centered position with respect to said path of movement of said pendulum.

Having thus described the invention, what is claimed as new and desired to be secured by Letters Patent is:

1. In an impact testing machine equipped with an impact member and with spaced supports for holding the opposite ends of a bar-shaped test specimen to be contacted by said impact member, said specimen having a channel extending in a direction transverse to the longitudinal axis of said specimen and from one side of said specimen to the other, said supports being arranged on opposite sides of and spaced equidistantly from the path of movement of said impact member; means for centering said specimen relative to said supports, comprising a bolt member located in said channel of said specimen and having an end section protruding laterally from said specimen, guide means provided with spaced guide surface elements arranged for location on opposite sides of said end section of said bolt member, and means operatively connected to said guide means for positioning said spaced guide surface elements thereof, when the same are between said supports and adjacent peripherally spaced portions of said end section of said bolt member, on opposite sides of and equidistantly from said path of movement of said impact member, to thereby center said specimen.

2. In a testing machine according to claim 1; said guide surface elements being provided with guide surfaces diverging from one another in the direction of movement of said impact member.

3. In a testing machine according to claim 1; said centering means further comprising a rotatable axle spaced from and extending parallel to the longitudinal axis of said bolt member, said positioning means comprising a beam carried by said axle and rotatable in a plane perpendicular to said axis of said bolt member and supporting said guide means for rotary displacement along a circular path intersecting at one part of its circumference said path of movement of said impact member.

4. In a testing machine according to claim 3; said guide surface elements being provided with guide surfaces diverging from each other in the direction of rotation of said beam with said axle.

5. In a testing machine according to claim 1; said guide surface elements being provided with parallel guide surfaces.

6. In an impact testing machine equipped with a pendulum and an impact element carried thereby, and with spaced supports for holding the opposite ends of a bar-shaped test specimen to be contacted by said impact element, said specimen having a channel of substantially circular cross-section extending transversely to the longitudinal axis of said specimen and from one side of the latter to the other, said supports being arranged on opposite sides of and spaced equidistantly from the path of movement of said pendulum with said impact element; means for centering said specimen relative to said supports, comprising a bolt member of circular cross-section located in said channel of said specimen and having an end section protruding laterally from said specimen, and guide means provided with spaced guide surface elements arranged for location on opposite sides of said end sections of said bolt member, said guide means being carried by said pendulum in advance of said impact element with said spaced guide surface elements disposed on opposite sides of and equidistantly from said path of movement of said impact element, whereby said guide surface elements, upon operational movement of said pendulum, first pass said end section of said bolt member adjacent peripherally spaced portions of the latter to center the same on said path of movement of said pendulum, thereby centering said specimen for contact by said impact element.

7. In a testing machine according to claim 6; said guide surface elements being provided with guide surfaces facing each other and diverging from one another in a direction away from said impact element.

References Cited in the file of this patent

UNITED STATES PATENTS

| 1,186,103 | Katzinger | June 6, 1916 |
| 2,059,177 | Ohrn | Oct. 27, 1936 |
| 2,139,527 | Sonntag | Dec. 6, 1938 |
| 2,617,293 | Schnadt | Nov. 11, 1952 |